United States Patent
Graham et al.

[19]

[11] Patent Number: 6,044,138
[45] Date of Patent: Mar. 28, 2000

[54] BILLING SYSTEM

[76] Inventors: R. William Graham, 22 S. St. Clair St., Dayton, Ohio 45402; Tony Xu, 400 Bitters #809, San Antonio, Tex. 78216; David M. Tumey, 5018 New Castle La., San Antonio, Tex. 78249

[21] Appl. No.: 09/197,399

[22] Filed: Nov. 20, 1998

Related U.S. Application Data

[63] Continuation-in-part of application No. 08/827,784, Apr. 11, 1997.

[51] Int. Cl.[7] ................................................ H04M 15/00
[52] U.S. Cl. ........................ 379/114; 379/112; 379/119; 379/144; 379/199
[58] Field of Search .................................. 379/111, 112, 379/114, 115, 116, 140, 141, 143, 144, 199, 117, 118, 119

[56] References Cited

U.S. PATENT DOCUMENTS

| | | | |
|---|---|---|---|
| 3,725,947 | 4/1973 | Albertini et al. | 379/114 |
| 3,911,446 | 10/1975 | Albertini et al. | 379/131 |
| 3,943,526 | 3/1976 | Albertini et al. | 379/74 |
| 4,935,956 | 6/1990 | Hellwarth et al. | 379/112 |

*Primary Examiner*—Curtis A. Kuntz
*Assistant Examiner*—Binh K. Tieu
*Attorney, Agent, or Firm*—R. William Graham

[57] ABSTRACT

A billing system for a service provider-client environment, which includes a service provider suite, a first CPU disposed at the service provider site having billing software resident on the first CPU for enabling logging of client data and service provider data. The billing software prompts a service provider to select one of a logging and no logging of time for one of a matter and a call can accrue an amount of time and associate the time with a client upon selection of the logging. The billing software manipulates the data corresponding to the amount of time and said client in a manner to produce a billing data file and accounts for crediting and debiting the billing data file. Additionally, billing software produces invoice indicia corresponding to billing data file. A printer is operably associated with said first CPU for printing an invoice having the corresponding billing data file and indicia thereon. A scanner is operably associated with said first CPU for scanning the indicia from the invoice to enable the billing software to apply a credit to the billing data file.

26 Claims, 11 Drawing Sheets

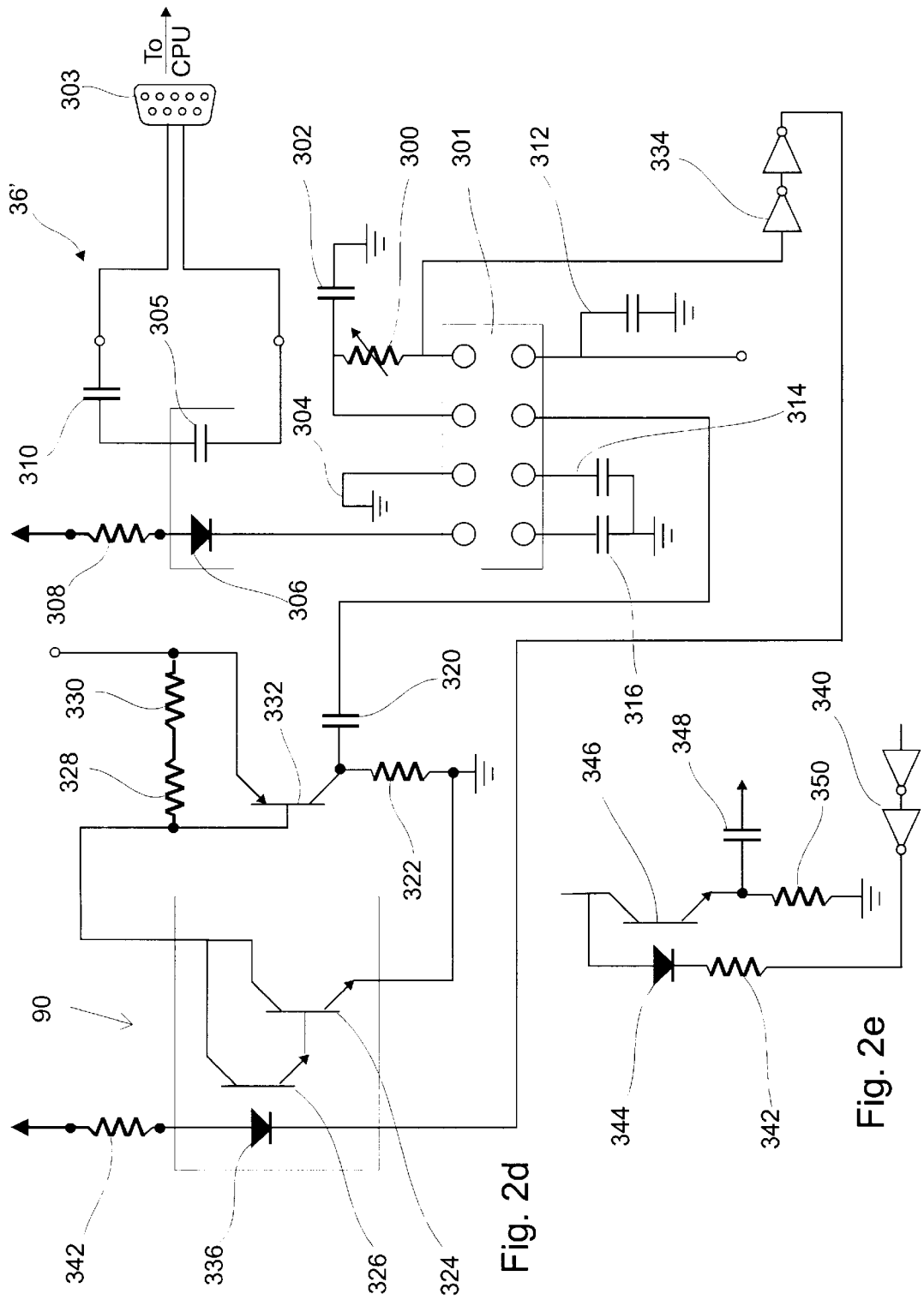

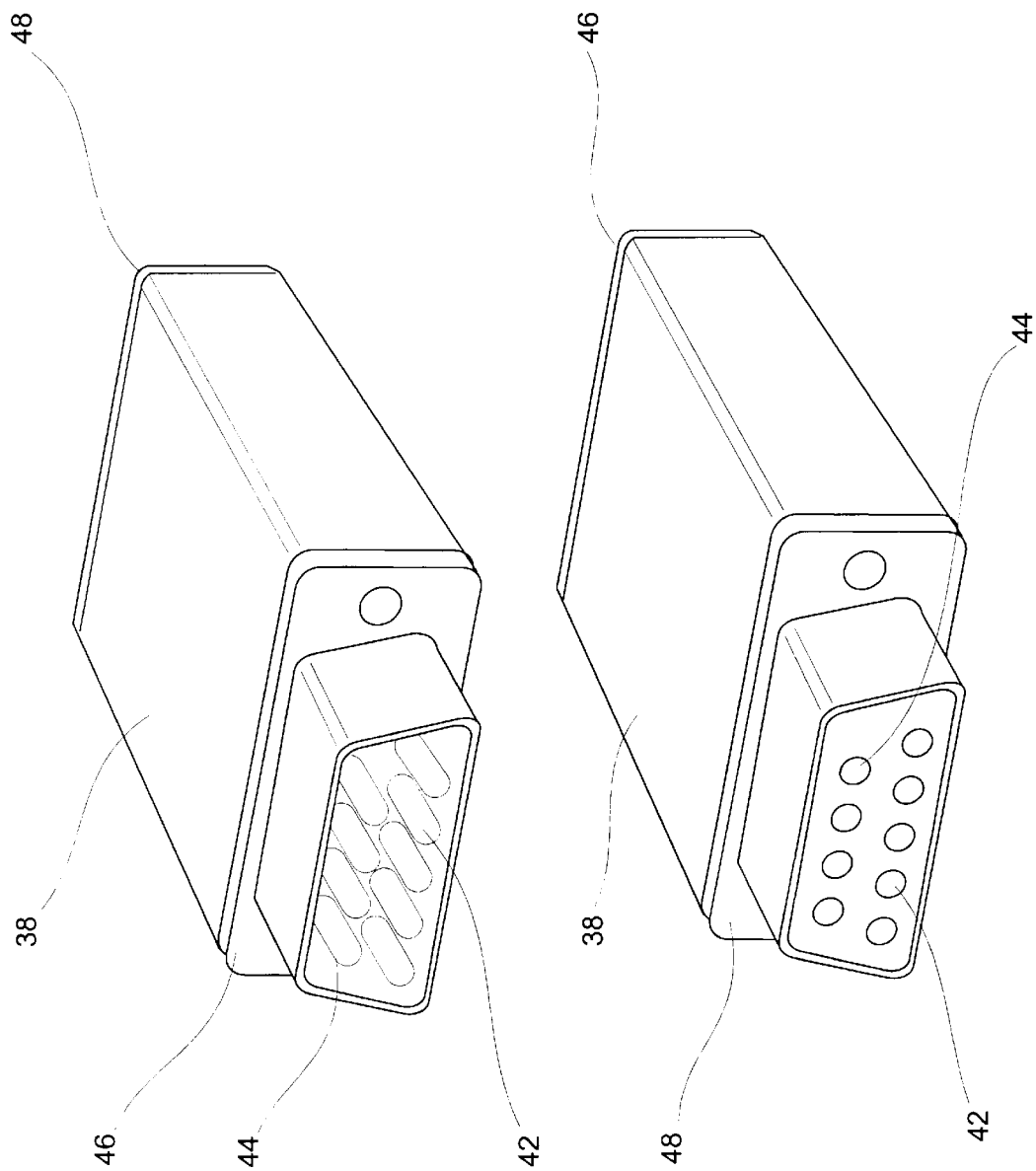

BILLING SYSTEM

This is a continuation-in-part of U.S. patent application Ser. No. 08/827,784 filed Apr. 11, 1997.

BACKGROUND OF THE INVENTION

1. Field of the Invention

The present invention relates to a billing system. More particularly, this invention relates to a billing system which provides enhanced forced accounting and reduced billing features.

2. Related Art

There are a number of software billing systems which exist in the art. These commonly do include a manual entry of time and enable in-house creation of a bill. These systems fail to adequately alleviate important problems associated with billing systems.

For example, some of these systems require that the service provider input time and then create a bill. However, the trend of professionals is to become more self-sufficient in their jobs and often requires the professional, accountant or lawyer for example, to become more computer-interactive and produce much of the work product. Depending upon the particular profession, there is a need to accurately account for and bill a client as a function of time spent on a particular matter.

Accounting for phone time remains troublesome. This is due to the fact that many of the calls which are made or received on behalf of a client may only account for a couple of minutes time to the professional and becomes either a nuisance to the professional to administratively log, bill and follow up weighed against the actual amount of time billed. Additionally, when the professional currently logs phone call time, it is commonly done in a preset increment of an hour, such as a sixth (10 minutes) of an hour, to account not only for the phone time, but also for the administrative time for billing and accounting. This can result in the client being over charged for the actual professional time spent. A further problem is the unproductive time spent in administrative tasks relating to billing and accounting. There is also a need for an improved method of tracking accounts receivables.

Accordingly, there remains a need for a better billing system. The present invention overcomes these limitations.

BRIEF SUMMARY OF THE INVENTION

It is an object of the present invention to improve billing systems.

It is another object to improve the equipment used in a billing system.

It is another object to reduce administrative time in billing and accounting tasks by employing the present invention.

Accordingly, the present invention is directed to a billing system which includes a telephone and a first CPU. The invention also includes means operably associated with the first CPU for detecting when the telephone is in use and generating a signal in response thereto.

There are software means resident on the first CPU for enabling logging of client data, service provider data and associating and accruing matter call time with a particular client each time the matter is begun or telephone is used into a stored data file in a memory associated with the first CPU. Means operably associated with the detecting means are also included for receiving the signal and automatically initiating the software means upon receipt thereof.

The invention further includes second CPU, preferably remotely located, operably associated with the first CPU with complimentary software means resident thereon for enabling communication with the software in the first CPU. The software means in the first CPU includes means for manually or automatically transmitting the data file to the second CPU. The software means of the second CPU has means for manually or automatically receiving and manipulating the data file in a manner to create an invoice to the client for the professional.

In one embodiment of the invention, there is a telephone and means operably associated with the telephone for detecting when the telephone is in use and generating a signal in response to the use. A first CPU is operably associated with the detecting means and has billing software means resident on the first CPU for enabling logging of client data, service provider data, wherein said billing software means is manually or automatically initiated in response to the signal and prompts a service provider to select one of a logging and no logging of the matter time or use, the billing software means includes means for accruing an amount of time of the matter or use and associating the time with a client upon selection of the logging and the billing software means includes means for writing and storing data corresponding to the amount of time associated with the client in a memory associated with the first CPU.

Another embodiment of the invention is directed to a billing system, which includes a first CPU having billing software means resident on the first CPU for enabling logging of client data, service provider data, wherein said billing software means is one of manually and automatically initiated and prompts a service provider to select one of a logging and no logging of billable time, the billing software means includes means for accruing an amount of time and associating the time with one client upon selection of the logging and the billing software means includes means for writing and storing data corresponding to the amount of time associated with the client in a billing data file of the memory associated with the first CPU. The billing software means includes means for generating invoice data corresponding to the billing data file and generating a scanable identification indicia corresponding to the invoice data. Means for printing the invoice data and identification indicia on an invoice are provided. Further included are means operably associated with the first CPU and the billing software means for scanning the indicia to enable the billing software means to readily sort to the invoice debit data and enable credit thereto.

Other objects and advantages will be readily apparent to those skilled in the art upon viewing the drawings and reading the detailed description hereafter.

BRIEF DESCRIPTION OF THE DRAWINGS

FIG. 2d is a schematic diagram of yet another telephone use detector with the present invention.

FIG. 2e is a schematic diagram of still another telephone use detector with the present invention.

FIG. 3 is a end perspective view of a part of an adapter part of the detector of the present invention.

FIG. 4 is another end perspective view of the part of FIG. 3.

DETAILED DESCRIPTION OF THE INVENTION

Figure 1A:
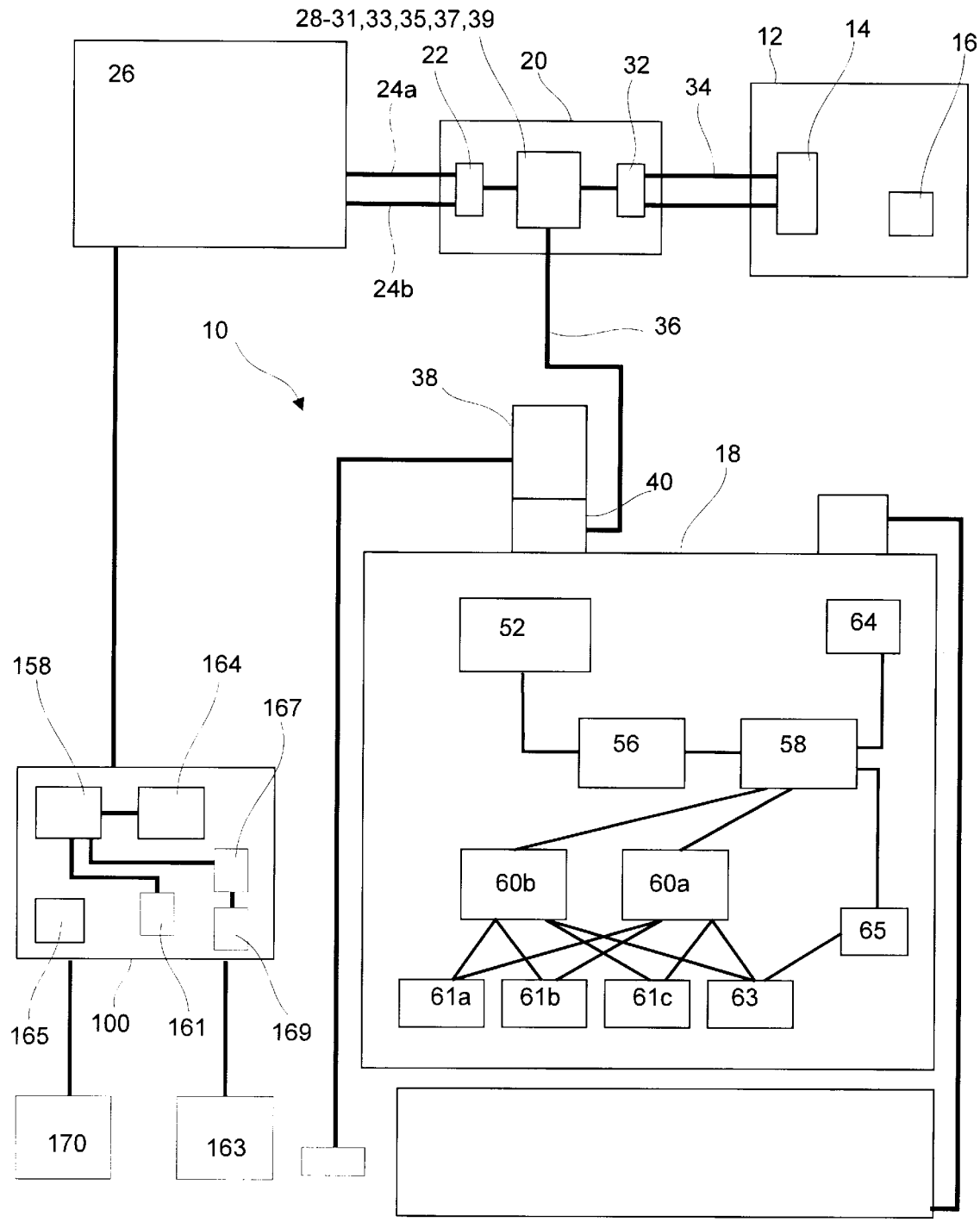
FIG. 1a is a schematic of the present invention.

Referring now to the drawings, the billing system of the present invention is generally referred to by the numeral 10. The billing system 10 includes a telephone 12 having a handset 14 and optionally, a speaker hands-free button 16. The invention also includes a CPU 18 which is operably connected to the telephone 12 as hereinafter described. It is contemplated that other voice communication means may be employed, for example, voice communication through the CPU 18 and that these devices are contemplated within the invention. It is understood that CPU 18 has operably associated memory and operating system, modem, clock, monitor and keyboard.

Figure 2A:
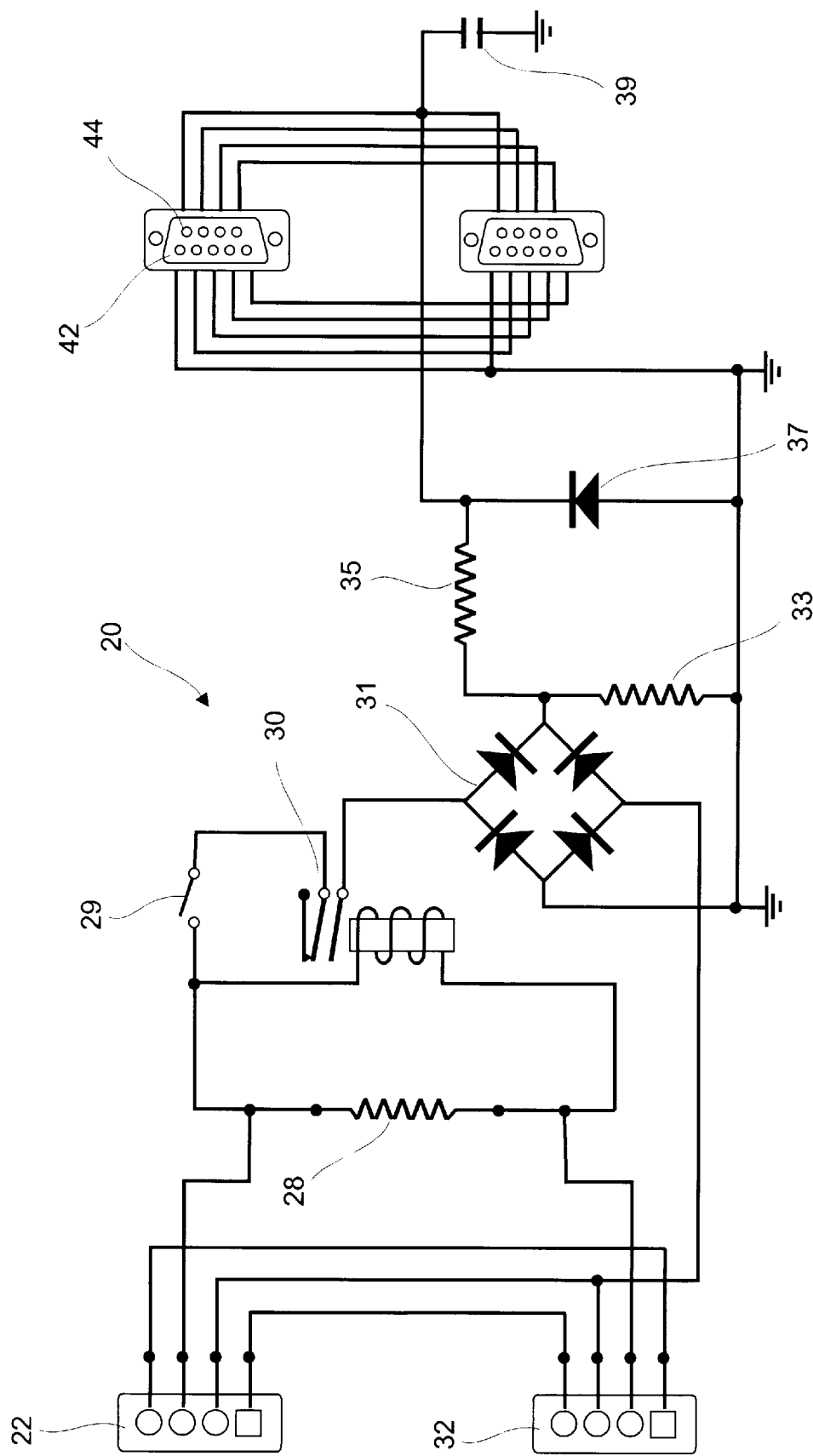
FIG. 2a is a schematic diagram of a telephone use detector with the present invention.

A telephone use detector 20 is operably connected with the telephone 12 the CPU 18 and a service source 26 for detecting when the telephone 12 is in use and generates a signal in response thereto. Referring to FIG. 2a, the telephone use detector 20 includes a conventional telephone jack port 22 (MODF1) to receive a terminal end of a telephone line 24 from the service source 26. The port 22 is operatively connected to a resistor 28 and relay 30 which are in parallel arrangement with one another.

The resistor 28 and relay 30 are also connected to another telephone line port 32 (MODF2) which receives a conventional terminal end of a telephone line 34 which has its other terminal end connected to the telephone 12. The relay 30 is operatively connected via a disable switch 29 to a full-wave bridge rectifier 31 which will automatically correct the line polarity in the event that the telephone service source 26 is miss-wired. Resistors 33 and 35 and zener diode 37 are operatively connected such that when the telephone 12 is in use, current will flow in the line 36 via the relay 30 being energized providing approximately 5 volts D.C. across the diode 37. The output of the diode 37 is connected to the pin 44, as shown in FIGS. 3 and 4, for example, which connect to the CPU 18 as described below. A capacitor 39 is provided to filter signal current sent to the CPU 18 and eliminate short transients.

It should be noted that this embodiment utilizes the power obtained directly from the telephone service sources 26. Therefore, there should be a common ground with the computer. This ground can be established, for example, by connecting the grounded side of the circuit directly to the center screw of a telephone jack utility box via a conducting wire.

Figure 1B:
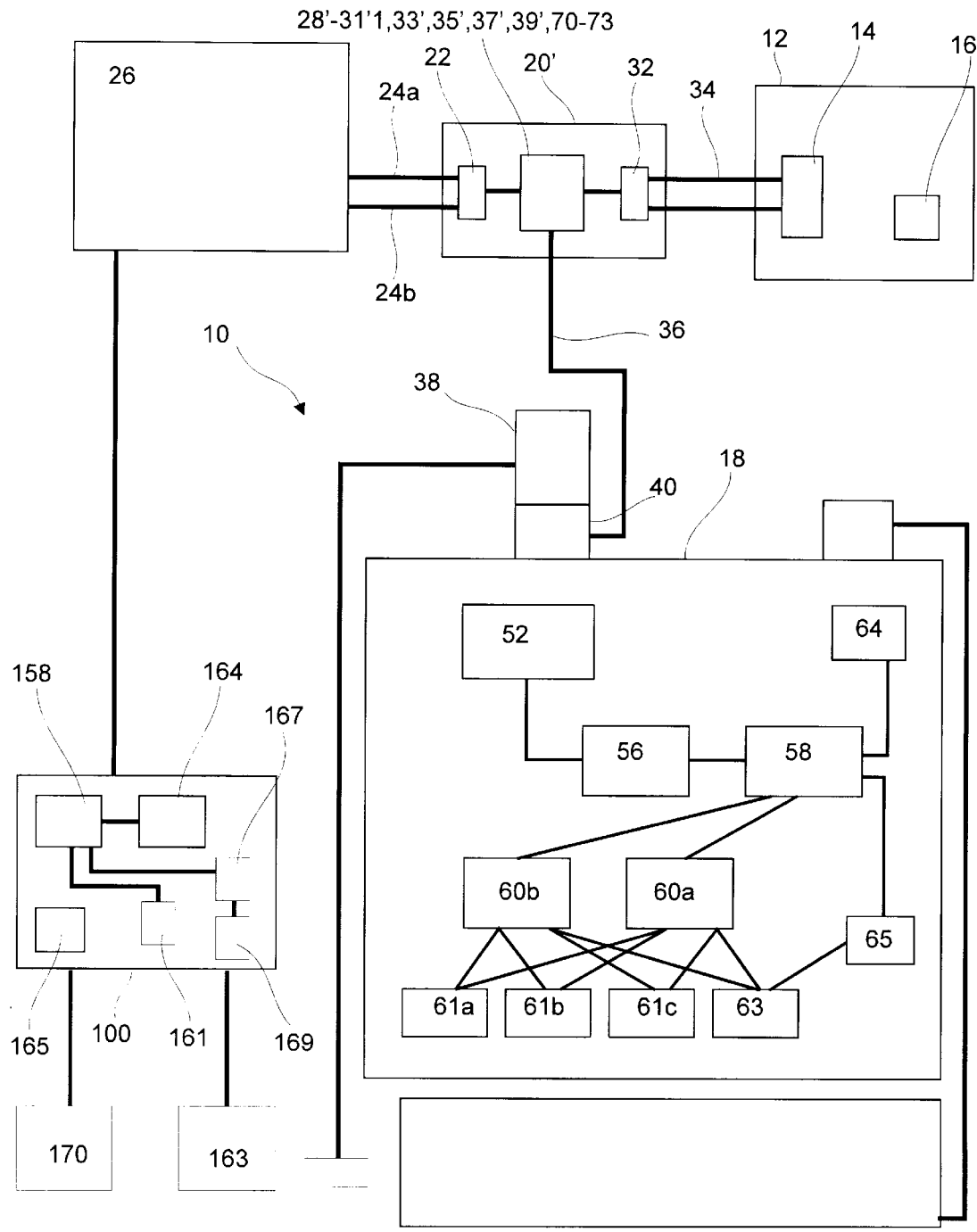
FIG. 1b is a schematic of another embodiment of the present invention.
Figure 2B:
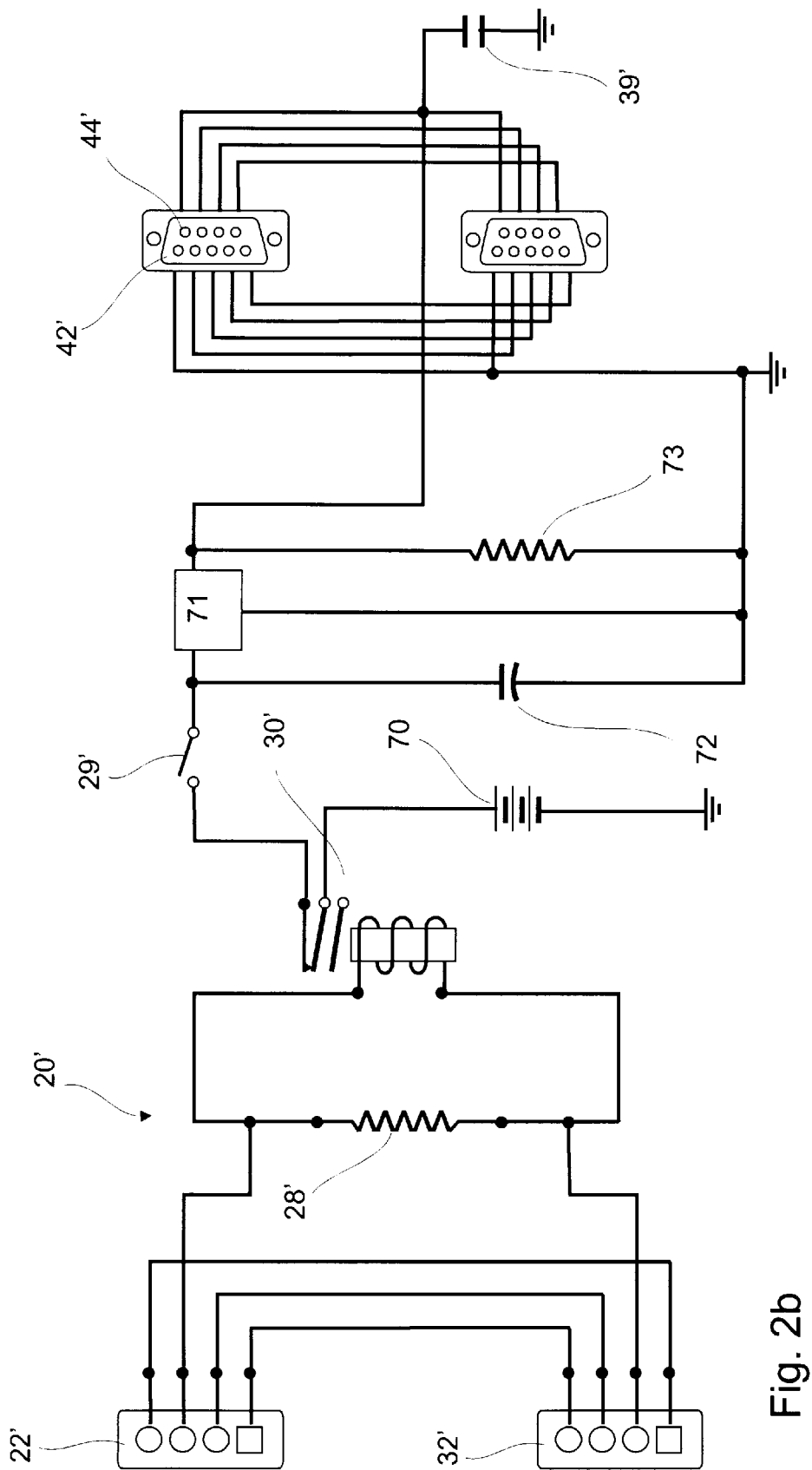
FIG. 2b is a schematic diagram of another telephone use detector with the present invention.

Another embodiment of the telephone use detector 20' is shown in FIGS. 1b and 2b. Here, the detector 20' is likewise operably connected to the telephone 12, the CPU 18 and the service source 26 for detecting when the telephone 12 is in use and generates a signal in response thereto. The detector 20' includes a conventional telephone jack port 22' (MODF1) to receive a terminal end of a telephone line 24 from the service source 26. The port 22' is operatively connected to a resistor 28' and relay 30' which are in parallel arrangement with one another.

The resistor 28' and relay 30' are also connected to another telephone line port 32' (MODF2) which receives a conventional terminal end of the telephone line 34 which has its other terminal end connected to the telephone 12. The relay 30' is operatively connected via the disable switch 29' to a battery 70 (e.g., a 9 volt battery as is commonly used in transistor radios). Regulator 71 and capacitor 72 are operatively connected such that when the telephone 12 is removed from its hook, current will flow in the line 26 causing relay 30' to energize providing power to regulator 71 which produces approximately 5 volts D.C. across resistor 73. The output of regulator 71 is connected to pin 44, as shown in FIGS. 3 and 4, for example, which connect to the CPU 18 as described above. A capacitor 39 is provided to filter the signal being sent to the CPU 18 to eliminate short transients.

Figure 1C:
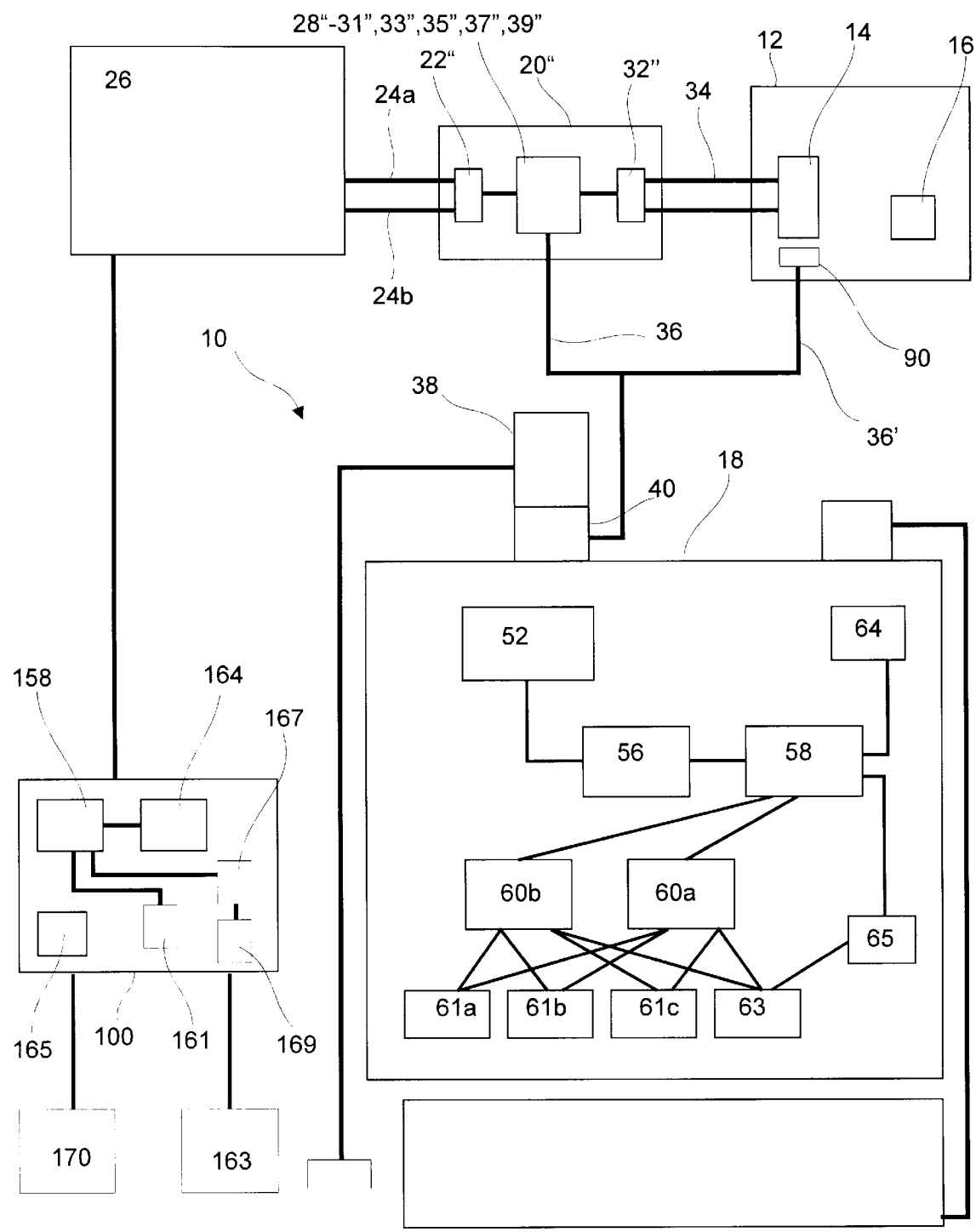
FIG. 1c is a schematic of another embodiment of the present invention.
Figure 2C:
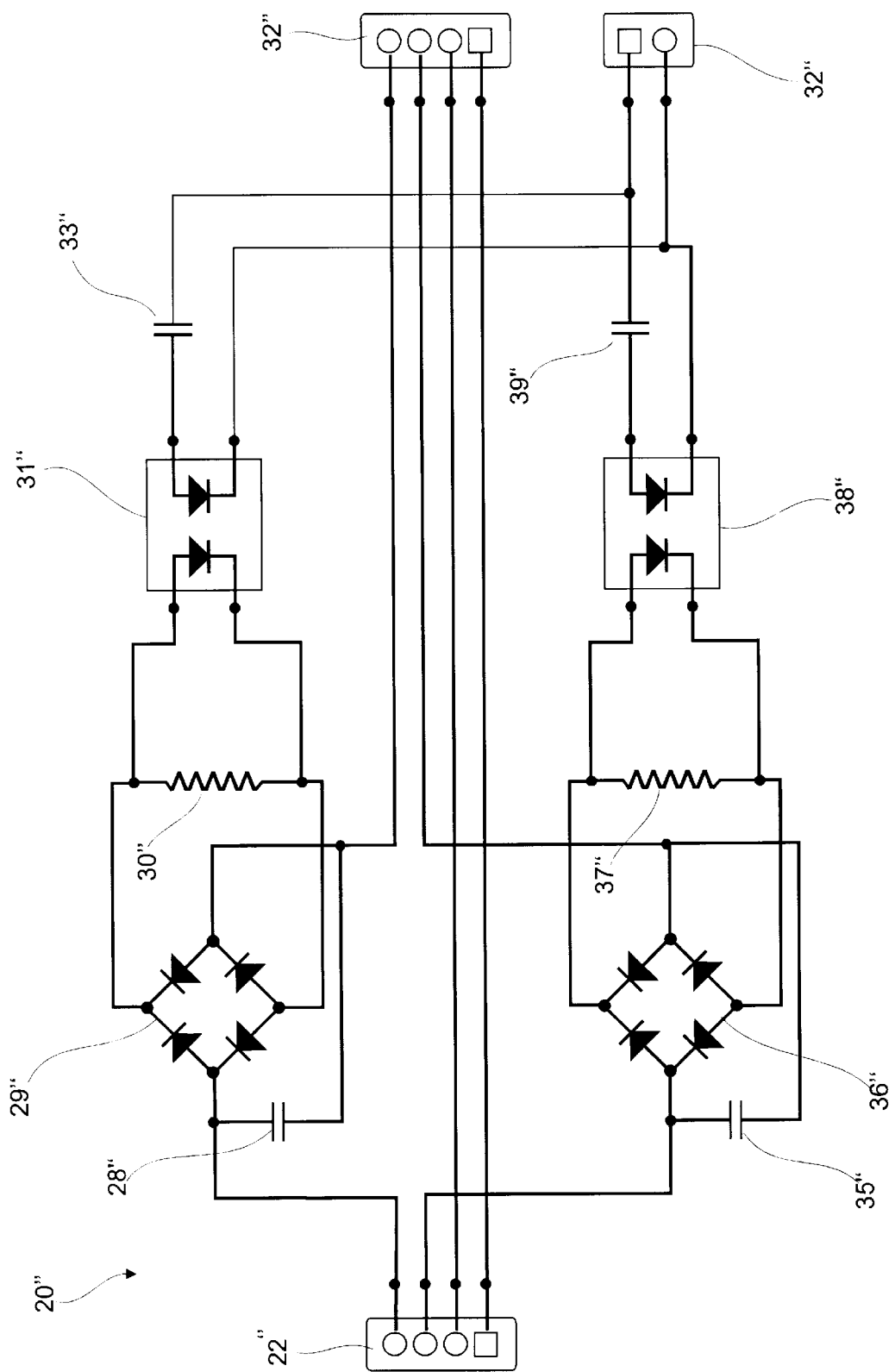
FIG. 2c is a schematic diagram of still another telephone use detector with the present invention.
Figure 5:
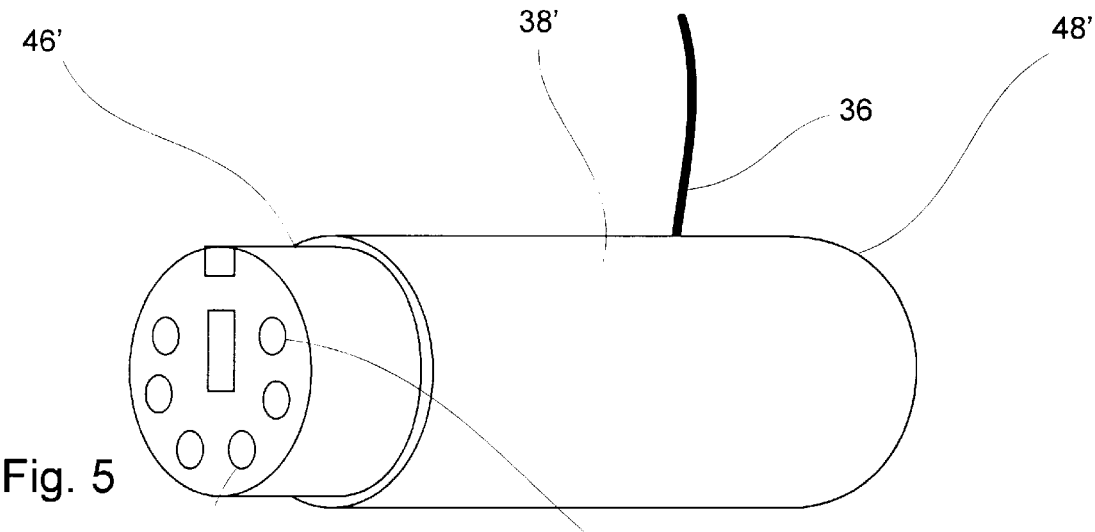
FIG. 5 is a end perspective view of another part of an adapter part of the detector of the present invention.
Figure 6:
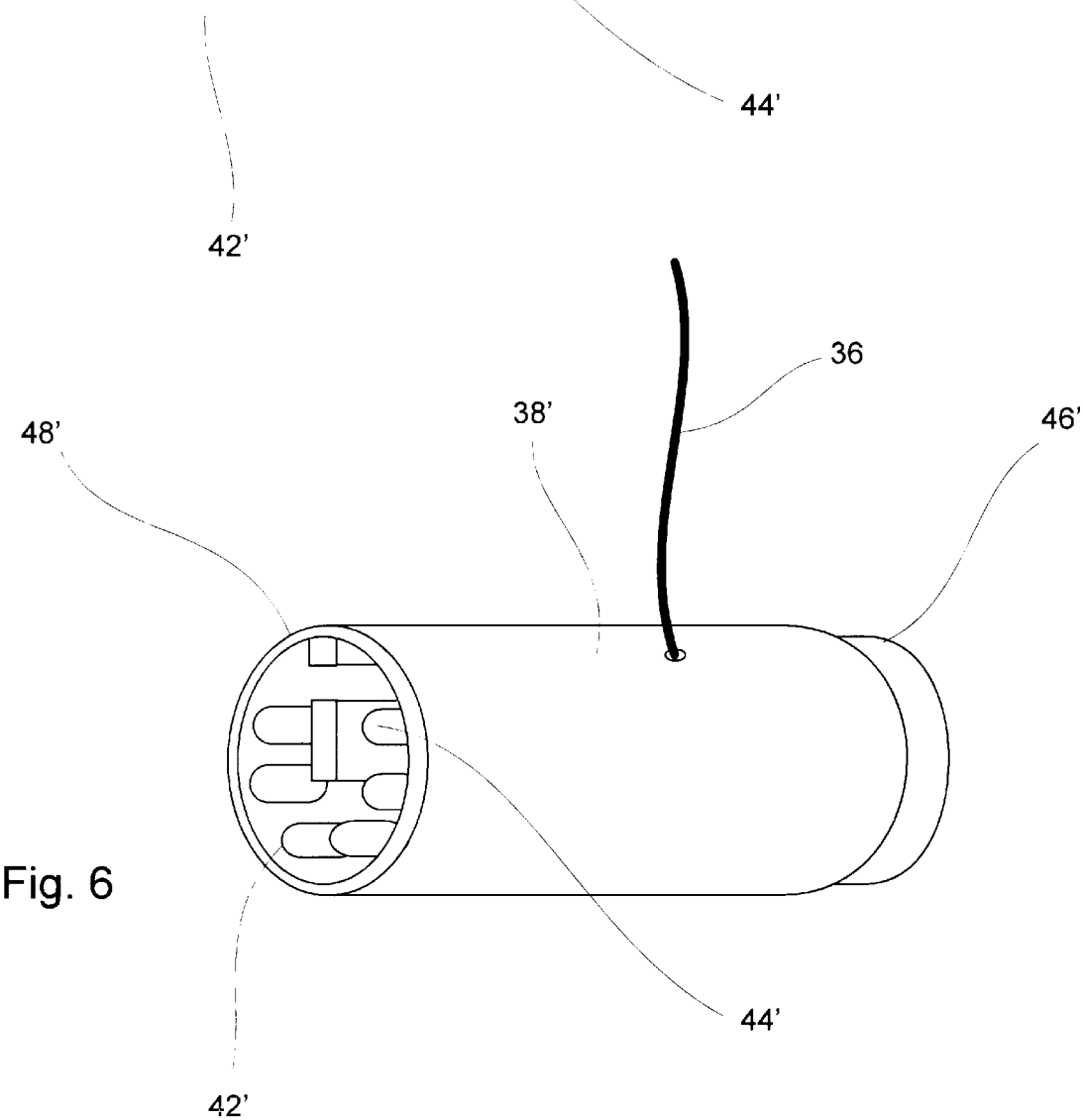
FIG. 6 is another end perspective view of the part of FIG. 5.

FIGS. 1c and 2c shows another schematic for a detector for a two line phone system. Here, two line jack port 22" connects to capacitor 28" which in turn connects to a bridge rectifier 29". The bridge rectifier 29" is operatively connected to a resistor 30" which is operatively connected to an optical coupler 31" as shown. The optical coupler 31" is connected to a capacitor 33" and line 2 of jack port 32".

A capacitor 35" operatively connects to two line jack port 22" and bridge rectifier 36". Bridge rectifier 36" operatively connects to a resistor 37". An optical coupler 38" connects to the resistor 37" and a capacitor 39" and line 1 of the jack port 32". Jack ports 22" and 32" are connected as shown in FIG. 2c. A voltage signal is sent through line 36 when a current is detected in the line 34, and the voltage signal is used in a similar manner as described for FIGS. 2a and 2b.

Figure 1D:
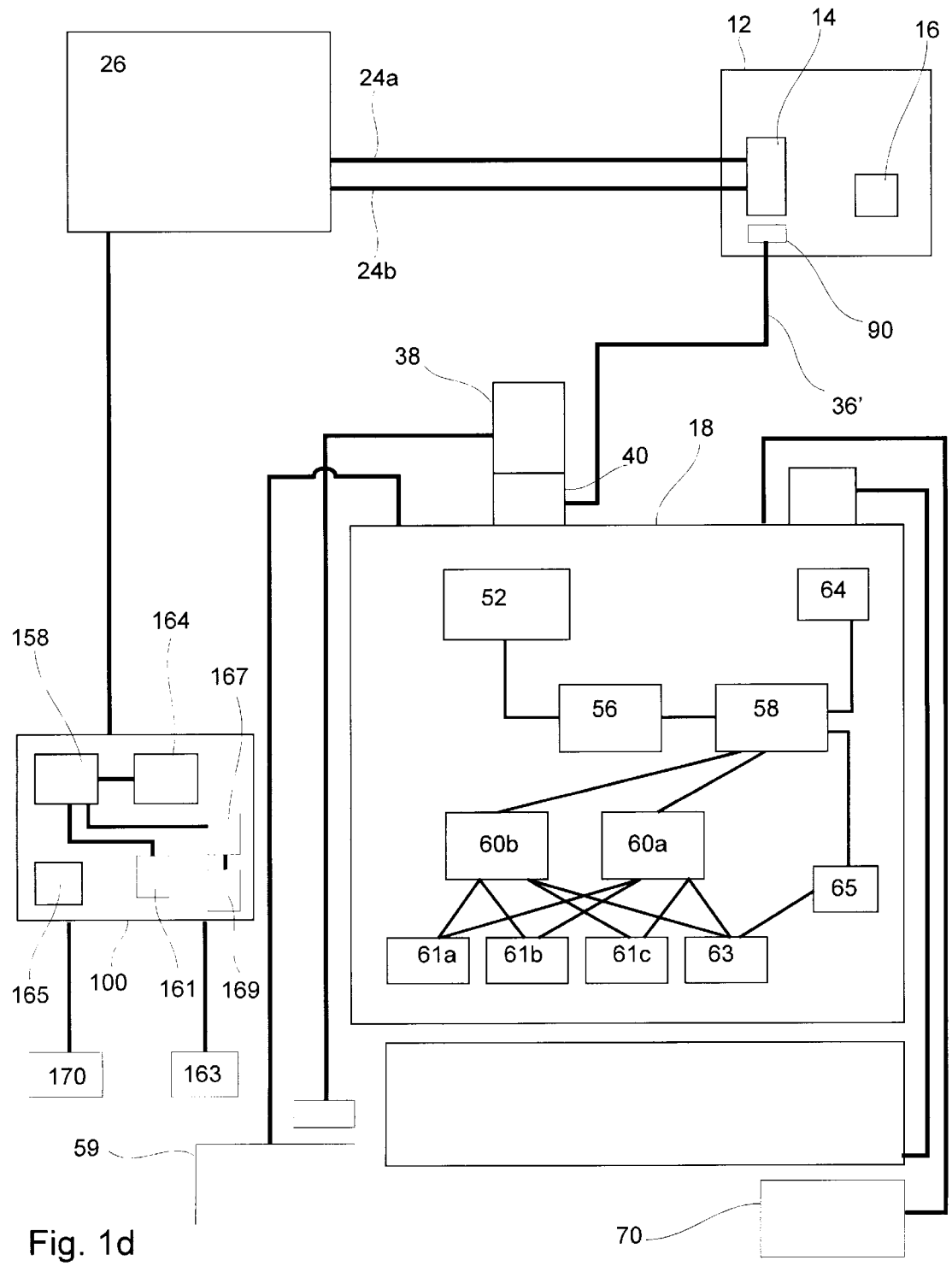
FIG. 1d is a schematic of another embodiment of the present invention.

FIGS. 1d and 2d is still another embodiment of a detector wherein an optical sensor 90 is employed on the telephone. Here, the optical sensor 90 is preferably mounted to a cradle of file telephone 12 which holds the handset 14. The optical sensor 90 provides a light to voltage conversion. The voltage output is proportional to the intensity of light impinging on the sensor 90. Thus, where the handset 14 is in the cradle, the optical sensor 90 detects the presence thereof and when out of the cradle, the optical sensor 90 detects absence of thereof and a signal is generated which travels through the line 36' to adapter 38 for use as described hereinafter for similar signals (voltage) sent via line a 36 wherein detectors 20 and 20' are employed.

Referring now to the schematic diagram as shown in FIG. 2d., the sensor assembly 90 consists of an infrared photo-diode 336 and integral infrared photo-transistor 326. Current to photo-diode 336 is limited by resistor 342. When the telephone receiver is "on-hook", light from photo-diode 336 is reflected back to photo-transistor 326 whereupon it is amplified by transistor 3324. When the telephone handset 14 is "off-hook", light from the photo-diode 336 is not reflected back to photo-transistor 326, and hence the circuit in this fashion is able to detect whether or not the telephone is in use. Integrated circuit 301, an LM567 tone decoder, provides a modulated square wave via inverter 334, which is utilized in driving the photo-diode 336. Photo-diode 336 is modulated in such a way as to prevent ambient light, such as interior or exterior lighting from interfering with the operation of the circuit. Modulated reflected light received by photo-transistor 326 and amplified by transistor 324 is further amplified by transistor 332 enabling the signal level to reach values which are suitable for input to integrated circuit 301. Resistors 322, 328 and 330 are selected to adjust the gain of the amplifier stage thus ensuring proper operation. Capacitor 320 couples the modulated signal to integrated circuit 301 while removing any direct current bias voltage produced by transistor 332. Integrated circuit 301 also serves the dual purpose of frequency detection. When the modulation frequency, which is produced at one of the pins of integrated circuit 301 is present to another pin of integrated circuit 301, integrated circuit 301 detects the presence of said modulation frequency and causes current to flow in light-emitting-diode 306 thus turning it on. Resistor 308 limits the current flow to LED 306. When LED 306 is turned on, opto-coupler is activated and allows signals to pass through capacitor 310. One lead from opto-coupler 305 is connected to the transmit pin of the computer's serial port, while another pin from opto-coupler 305 is connected to the receive pin of the computer's serial port via connector 303 which is a DB-9 styled connector. Once LED 306 activates opto-coupler 305, the signals are looped through the serial port whereupon the computer is able to detect the presence of the activation. Each time the telephone is removed from the hook, integrated circuit 301 detects the loss of reflected signal and activated the opto-coupler 305 thus signally the computer as to the telephones use. The said modulation frequency is determined by resistor 300 and capacitor 302 which form a standard RC oscillator. Capacitors 316 and 314 are filters used to set the detection bandwidth and output ripple. Capacitor 312 is used to filter the power supply input.

An alternative embodiment of optical sensor 90 is also shown. It utilizes an infrared photo-diode 344 and current limiting resistor 342 which is electrically similar to diode 336 and 342. Infrared photo-transistor 346 is utilized in place of transistors 326 and 324. Resistor 350 sets the gain of the photo-transistor while capacitor 348 couples the modulated light signal from the photo-transistor 346 to the integrated circuit 301 in the same way as capacitor 320.

Turning now to the interconnection of the detector 20 and CPU 18, a line 36 is operatively associated with the relay 30 of the detector 20 at one end such that current runs through the line 36 when the relay 30 is in a closed position indicating that the telephone 12 is in use. Another end of the line 36 operatively connects to an adapter 38 designed to connect to a port 40 of the CPU 18, for example, a serial port or mouse port. The adapter 38 is equipped with conventional number of pins 42 as would be required for such port 40 to permit modem or mouse communication depending upon the adapter 38 or 38' used. One pin 44 is operatively connected to the line 36. It is contemplated that other modem connections may be employed with CPU 18 to communicate via source 26.

The adapter 38 includes a male end 46 and female end 48. The pins 42 extend from the male end 46 to the female end 48. In this regard, the female end 48 is formed to operably receive a male end of a conventional mouse adapter 50 (not shown). A terminate and stay resident (TSR) software means 52 is operatively resident in the memory 54 on the CPU 18 and is preferably always operating and running on the CPU 18 and looking at the pin 44 to determine the current existing in the pin 44. The TSR 52 is operably connected with means 56 for initiating billing software means 58 once a current is detected in the pin 44. It is understood that other modifications, derivations and improvements of performing this aspect of the invention will be readily apparent to persons skilled in the art.

The billing software means 58 is operatively resident in the memory 54 of the CPU 18 and includes means 60*a* for associating, logging and storing of first client data into a client data file 61*a*, matter/call comment data into a comment data file 61*b* and service provider data into a service provider data file 61*c* and for associating and accruing the amount of time spent on a matter or call and date of such matter or call with a first particular client, wherein the time may be for which there is a current detected in line 36 ("call time") or the time which accrues for a matter worked. The billing software means 58 provides for manual initiation and termination of time logging as it is associated with the clock of the CPU 18. If the matter or call is desired to be billed to the data client, the means 60 provides for writing and storing such all corresponding client data, service provider data, matter/call data and time data into a matter/call billing data file 63 in memory 54.

The billing software means 58 can pause the accrual of time aspect of means 60*a*, for example, in a manner to stay accrual of the call time for the first client matter or call for a condition such as another matter worked on or call being received or made on line 36, using call waiting or three way calling modes, for example. This permits the billable call time to be accurately reflected for the first client. In this vein, the billing software means 58 is capable, preferably automatically in a like manner as described above, of initiating another means 60*b* for associating, logging and storing of second client data into a client data file 61*a*, matter/call comment data into a comment data file 61*b* and service provider data into a service provider data file 61*c* and associating and accruing the amount of time for which a matter is worked or a current detected in line 36 ("call time") and date of such matter or call with a second client and, if the matter or call is desired to be billed to the second client, writing and storing such data into matter/call billing data file 63. It is noted that means 60 can be initiated by the user enabling the use of an edit mode of billing software means 58 for purposes of editing the data.

In addition, for the case of multiple lines, the detector 20" is preferably equipped to detect usage on multiple lines 24*a* and 24*b*. For example, the current detected in lines 24*a* and 24*b* can be added together and the TSR means 52 can further detect the additional current and initiate the billing software means 58 to initiate means 60*b*.

Upon initiation, billing software means 58 displays a screen (e.g., a windows-based screen) on the monitor prompting the service provider to log the matter/call or cancel the logging of the matter or call. If the service provider cancels the logging, the screen disappears, the billing software means 58 application is minimized and the logging stayed while in a minimized state, and the screen reverts to a prior window application which may have been running. Upon either manually initiating the billing software means 58 or receiving a call, the screen is maximized providing the user the option to log another matter/call for a client.

Upon selecting logging of the matter/call, billing software means 58 displays a screen requesting service provider to select whether the matter or call is to be billed to a "new client" or "old client." In selecting "old client" the billing software means 58 displays a screen requesting service provider to select with which client the matter, call time data, date data and comment data is to be associated. Manual initiation of this function permits selection of the client or creation of the new client data. Upon selection of the client, the means 60 is initiated and a screen is displayed permitting or requesting the service provider to enter comments to be associated with the matter/call, where after entry, the screen disappears to a minimized state showing it running on a task bar and returns to the prior screen (thus task switching back to the prior window to environment).

The means 60 associates the matter/call time data, date data and comment data with the selected client from the client data file 61a. Upon completion of the matter the user maximizes the screen and is enabled by software billing means 58 to stop time accrual and in the case of a call, i.e., the line current ceases to be detected by the TSR means 52 and the screen is maximized, where in either case the means 60 provides for storing the associated matter/call billing time data, date data, client data, and comment data with the service provider data into the matter/call billing data file 63 in the memory 54 of the CPU 18.

Means 60 permits entry of client data into client data file 61a via a client screen which displays client name field, contact name field, street address field, city address field, state zip code field, country field, work, fax and home telephone fields and creates a unique identification for each client. Similarly, permitted is the entry of comment data into the comment data file 61b via a comment screen having comment field. Likewise, entry of service provider data is permitted via a service provider screen having company name field, service provider name field, street address field, city address field, state zip code field, country field, work, fax and home telephone fields, hourly rate field and COM port field and unique identification for the service provider is permitted and stored in the service provider data file 61c. The software means 58 further has means 65 for encrypting/de-encrypting (access protecting and accessing the access protected data) the data in the billing data file 63.

Another aspect of the invention includes second CPU 100 operably associated with the first CPU 18 via, for example, the service source 26 and conventional CPU modem links or a network. The CPU 100 likewise includes operably associated memory and operating system, clock, monitor, modem and keyboard and is provided with complimentary billing software means 158 resident in the 154 memory of the CPU 100 and has means 165 for encrypting/de-encrypting the billing data file 63. The billing software means 58 and 158 include means 64 and 164, respectively, for communicating with one another in a manner such that the data in the data file 63 may be transmitted, preferably in an encrypted form, and de-encrypted by the CPU for purposes of generating an invoice to the client. The billing software means 58 in the first CPU 18 includes means for manually or automatically transmitting the billing data file 63 to the second CPU. 100

The communication means 64 is equipped to perform one of automatically transmitting the data at a predetermined time of each month or manually transmitting the data at the service provider's initiation. In the case of electing manual or automatic transmission, the communication means 64 transmits at the predetermined time/date upon the initiation of the billing software means 58. The communication means 164 is preferably continuously set up to receive the transmitted billing data file and in turn, the billing software means 158 de-encrypts, if needed, and generates an invoice (by way of any suitable printing means) to the client on behalf of the service provider. Herein, the invoice generated would include listing the client data and service provider data with itemized matter/call time data and associated comment data.

The billing software means 158 manipulates the received billing data file 63 to an invoice data file 161 which is used to generate an invoice. A printer 163 is operably connected to the CPU 100 and billing software means 158 to permit the invoice to be printed.

Further, the invention includes accounting aspect for marking whether the invoice has been paid. Software billing means 158 includes means 167 for generating scanable identification invoice indicia data 169 corresponding to particular billing data file 63 and which is stored in invoice data file 161 for a client. There can be any number of invoice data files 161, the amount of which is created by billing software means 158 as needed. The invoice data file 161 and scannable identification invoice indicia data 169 are printed on invoice 200 via employing printer 163. The invoice indicia 169 is preferably in the form of a bar code 201 on invoice 200. A scanner 170 is operably associated with the CPU 100 and the billing software means 158 for scanning the bar code 201 to enable the billing software means 158 to readily sort to the corresponding billing invoice data file 161 and post with a credit (full or partial) thereto. Outstanding invoices can be rebilled by billing software means 158 if not credited. The billing software means 158 provides a window on the CPU's 100 display 203 to enable visual confirmation of the crediting of an invoice.

Figure 7:
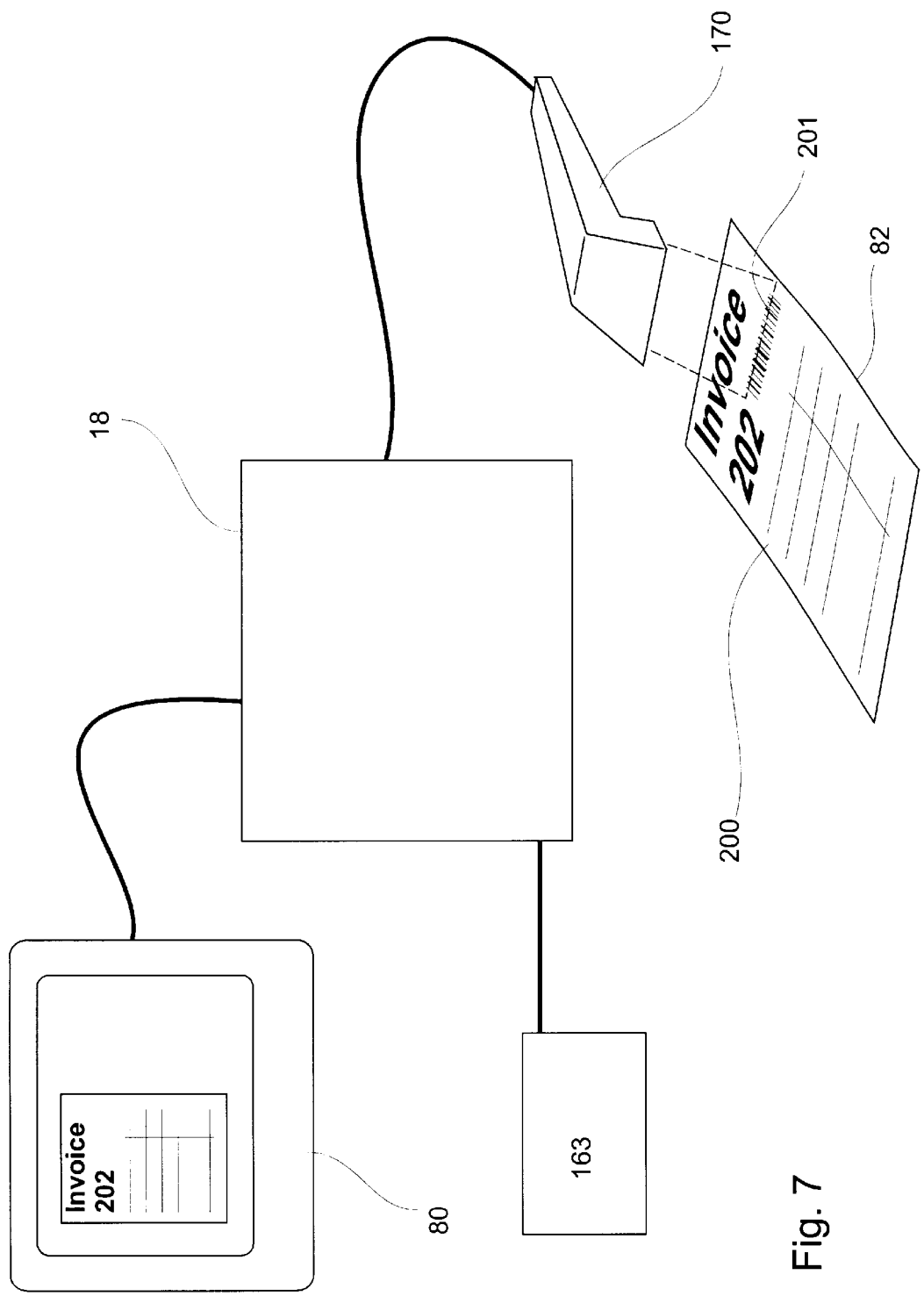
FIG. 7 is a schematic of another embodiment the present invention.

While this aspect of the invention is shown as residing on the CPU 100, it is contemplated that the accounting software in the billing software means 158, printer and scanner can be implemented on CPU 18 as shown in FIG. 7. Thus, a fast mechanism is provided by the present invention whereby a returned invoice 200 with payment can be credited. The billing software means 158 is capable of partial crediting of a bill, wherein the bill data in the billing data file 161 will remain unmarked paid until fully paid.

The above described embodiment is set forth by way of example and is not for the purpose of limiting the present invention. It will be readily apparent to those of ordinary skill in the art that obvious modifications, derivations and variations can be made to the embodiment without departing from the scope of the invention. Accordingly, the claims appended hereto should be read in their full scope including any such modifications, derivations and variations.

What is claimed is:

1. A billing system for a service provider-client environment, which includes:

a service provider site;

a telephone device disposed at said service provider site;

means disposed at said service provider site operably associated with said telephone device for detecting when the telephone device is in use and generating a signal in response to said use; and a first CPU disposed at said service provider site operably associated with said detecting means and having billing software means resident on said first CPU for enabling logging by a service provider of client data and service provider data, wherein said billing software means is automatically initiated in response to said signal and prompts a service provider to select one of a logging and no logging of said use, said billing software means includes means for accruing an amount of time of said use and associating said time with a client upon selection of said logging and said billing software means includes means for writing and storing data corresponding to said amount of time and said client in a memory associated with said first CPU, wherein said detecting means and said telephone device are at least one of externally and internally connected.

2. The billing system of claim 1, wherein said first CPU includes means is operably associated with said detecting means for receiving said signal and automatically initiates said software means upon receipt thereof.

3. The billing system of claim 1, which further includes a second CPU disposed at a remote site operably associated with the first CPU having complimentary billing software means resident thereon and for enabling communication with said software on said first CPU.

4. The billing system of claim 3, wherein said software means in said first CPU includes means for one of manually and automatically transmitting said data file to said second CPU and said software means of said second CPU includes means for one of manually and automatically receiving and manipulating said data file in a manner to permit creating an invoice to the client for the service provider.

5. The billing system of claim 1, wherein said billing software means is further characterized to enable logging, writing and storing of comment data in said memory and further associating said amount of time and said client with said comment data.

6. The billing system of claim 1, wherein said billing software means is further characterized as being capable of staying accrual of said time.

7. The billing system of claim 1, wherein said billing software means is further characterized to include means for access protecting said data.

8. The billing system of claim 7, wherein said billing software means is further characterized to include means for accessing said access protected data.

9. The billing of claim 3, wherein said billing software means on said first CPU is further characterized to include means for access protecting said data and said billing software means on said second CPU is further characterized to include means for accessing said access protected data.

10. A billing system for a service provider-client environment, which includes:
  a service provider site;
  a communications linking device disposed at said service provider site;
  a first CPU disposed at said service provider site operably associated with said communication linking device and having billing software means resident on said first CPU for enabling logging of client data and service provider data, wherein said billing software means prompts a service provider to select one of a logging and no logging of time for one of a matter and call, said billing software means includes means for accruing an amount of time and associating said time with a client upon selection of said logging and said billing software means includes means for manipulating said data corresponding to said amount of time and said client in a manner to produce a billing data file, and said billing software means includes accounting means for crediting and debiting said billing data file;
  means operably associated with said first CPU and said billing software means for producing an invoice indicia corresponding to said billing data file;
  means operably associated with said first CPU and said billing software means for printing an invoice having said corresponding billing data file and indicia thereon; and
  means operably associated with said first CPU and said billing software means for scanning said indicia from said invoice to enable said billing software to apply a credit said billing data file.

11. The billing system of claim 10, where said first CPU includes means for electronically transmitting said billing data file; and further includes a second CPU disposed at a remote site having means for electronically receiving said billing data file and having complimentary billing software means resident thereon, wherein said invoice producing means operatively reside therein and said printing means and said scanning means are operatively connected to said second CPU and associated with said billing software means on said second CPU.

12. The billing system of claim 10, which further includes means for writing and storing data corresponding to said amount of time and said client in a memory associated with said first CPU.

13. The billing system of claim 11, wherein said software means in said first CPU includes means for one of manually and automatically transmitting said data file to said second CPU and said software means of said second CPU includes means for one or manually and automatically receiving and manipulating said data file in a manner to permit creating an invoice to the client for the service provider.

14. The billing system of claim 10, wherein said billing software means in said first CPU is further characterized to enable logging, writing and storing of comment data in said memory and further associating said amount of time and said client with said comment data.

15. The billing system of claim 10, wherein said billing software means in said first CPU is further characterized as being capable of staying accrual of said time.

16. The billing system of claim 11, wherein said billing software means is further characterized to include means for access protecting said data.

17. The billing system of claim 16, wherein said billing software means is further characterized to include means for accessing said access protected data.

18. The billing system of claim 11, wherein said billing software means on said first CPU is further characterized to include means for access protecting said data and said billing software means on said second CPU is further characterized to include means for accessing said access protected data.

19. A billing system for a service provider-client environment, which includes:
  a service provider site;
  a communications linking device disposed at said service provider site;
  a first local on site CPU disposed at said service provider site operably associated with said communication linking device and having billing software means resident on said first CPU for enabling logging of client data and service provider data, wherein said billing software means prompts a service provider to select one of a logging and no logging of time for one of a matter and call, said billing software means includes means for accruing an amount of time and associating said time with a client upon selection of said logging and said billing software means includes means for manipulating said data corresponding to said amount of time and said client in a manner to produce a billing data file, and having means for electronically transmitting said billing data file; and
  a second remote off site CPU disposed at a remote site having means for electronically receiving said billing data file and having complimentary billing software means resident thereon with means for generating an invoice having said corresponding billing data file oriented thereon.

20. The billing system of claim 19, which further includes means for writing and storing data corresponding to said amount of time and said client in a memory associated with said first CPU.

21. The billing system of claim 19, wherein said software means in said first CPU includes means for one of manually and automatically transmitting said data file to said second CPU and said software means of said second CPU includes means for one of manually and automatically receiving sand manipulating said data file in a manner to permit creating said invoice to the client for the service provider.

22. The billing system of claim 19, wherein said billing software means in said first CPU is further characterized to enable logging, writing and storing of comment data in said memory and further associating said amount of time and said client with said comment data.

23. The billing system of claim 19, wherein said billing software means in said first CPU is further characterized as being capable of staying accrual of said time.

24. The billing system of claim 19, wherein said billing software means of said first CPU is further characterized to include means for access protecting said data.

25. The billing system of claim 19, wherein said billing software means of said second CPU is further characterized to include means for accessing said access protected data.

26. The billing system of claim 19, wherein said billing software means on said first CPU is further characterized to include means for access protecting said data and said billing software means on said second CPU is further characterized to include means for access protecting said access protected data.

* * * * *